US006131065A

United States Patent [19]

Marszalek

[11] Patent Number: 6,131,065

[45] Date of Patent: Oct. 10, 2000

[54] ELECTRONIC FLIGHT DATA STRIPS AND METHOD FOR AIR TRAFFIC CONTROL

[75] Inventor: John A. Marszalek, Germantown, Md.

[73] Assignee: Cardinal Communications, Inc., Gaithersburg, Md.

[21] Appl. No.: 09/030,126

[22] Filed: Feb. 25, 1998

[51] Int. Cl.$^{7}$ .............................. G06G 7/70; G06G 7/76; G06F 19/00

[52] U.S. Cl. ............................ 701/120; 702/144; 242/36; 701/14; 244/189; 244/1 R

[58] Field of Search ..................... 701/120, 14; 244/189, 244/1 R; 342/36; 702/144

[56] References Cited

U.S. PATENT DOCUMENTS

| | | | |
|---|---|---|---|
| 4,005,388 | 1/1977 | Morley et al. . | |
| 4,298,793 | 11/1981 | Melis et al. . | |
| 4,672,759 | 6/1987 | Docherty et al. . | |
| 4,755,883 | 7/1988 | Uehira . | |
| 4,766,433 | 8/1988 | Herman et al. . | |
| 4,785,564 | 11/1988 | Gurtler . | |
| 4,849,614 | 7/1989 | Watanabe et al. . | |
| 4,916,441 | 4/1990 | Gombrich . | |
| 5,025,382 | 6/1991 | Artz | 701/120 |
| 5,113,178 | 5/1992 | Yasuda et al. . | |
| 5,260,874 | 11/1993 | Berner et al. | 701/33 |
| 5,377,109 | 12/1994 | Baker et al. | 701/14 |
| 5,396,264 | 3/1995 | Falcone et al. . | |
| 5,541,863 | 7/1996 | Magor et al. | 702/122 |
| 5,606,344 | 2/1997 | Blaskey et al. . | |
| 5,659,475 | 8/1997 | Brown . | |
| 5,913,912 | 6/1999 | Nishimura et al. | 701/35 |
| 5,941,929 | 8/1999 | Shiomi et al. | 701/120 |

FOREIGN PATENT DOCUMENTS

| | | | |
|---|---|---|---|
| 86/02750 | 5/1986 | WIPO | G06F 13/00 |

OTHER PUBLICATIONS

*Aviation Week & Space Technology*, Feb. 2, 1998, pp. 42–63.

*Primary Examiner*—William A. Cuchlinski, Jr.
*Assistant Examiner*—Olga Hernandez
*Attorney, Agent, or Firm*—Michael de Angeli

[57] ABSTRACT

A portable, re-usable, battery-powered, electronic device for storing, displaying and modifying air traffic control information. The electronic flight data strip receives input data from an external data source via infrared or radio transmission, stores the data in an on-board memory device, displays selected portions of the received data for viewing by an air traffic controller, and receives and displays inputs from the air traffic controller either directly through integral switches or via aforesaid communications channels. All input and output data messages and air traffic controller commands may be stored and time tagged for later retrieval. The contents of the stored memory can also be interrogated and modified by external data processing devices. Following completion of the flight, the contents of the internal memory can be interrogated for the purpose of archiving or investigation and/or cleared for subsequent re-use on another flight.

15 Claims, 1 Drawing Sheet

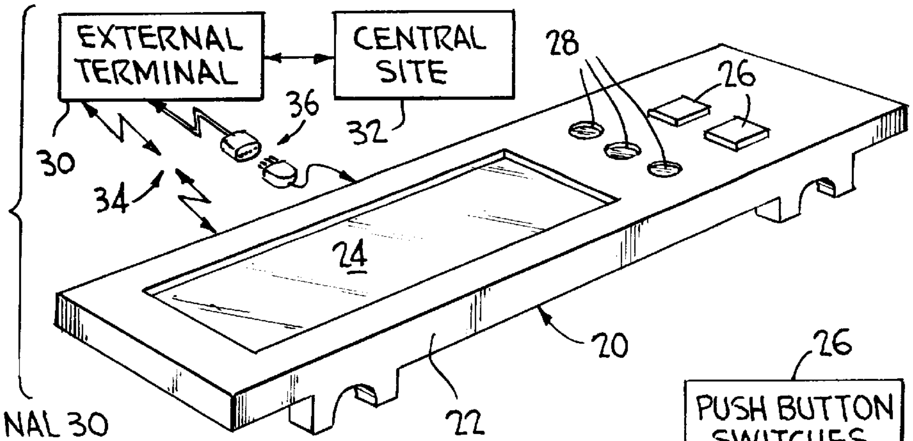
FIG. 2
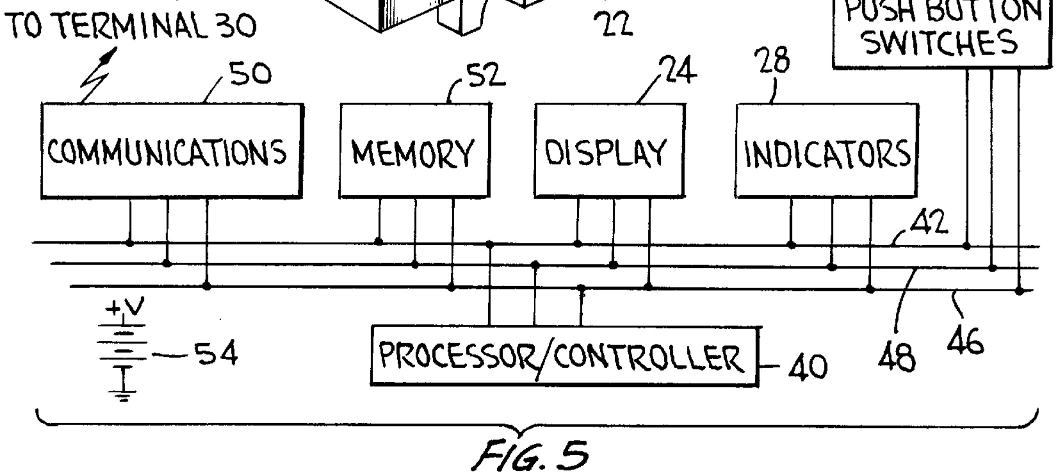
FIG. 5
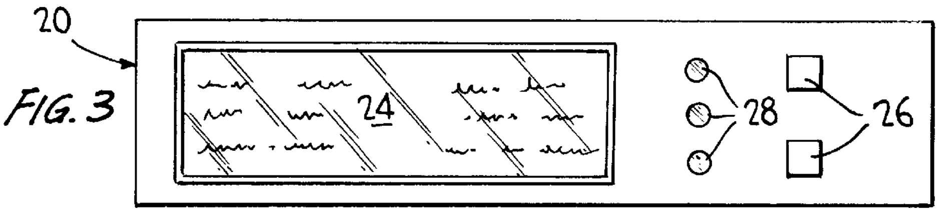
FIG. 3
FIG. 1 (PRIOR ART)
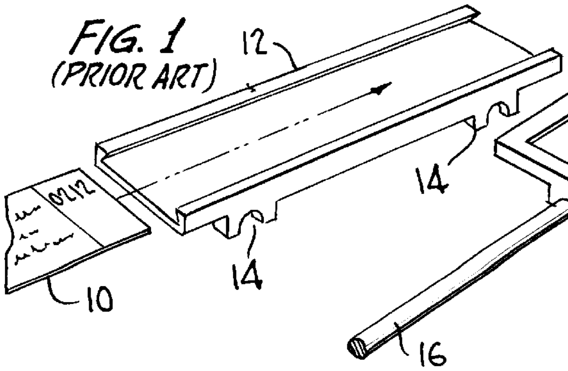
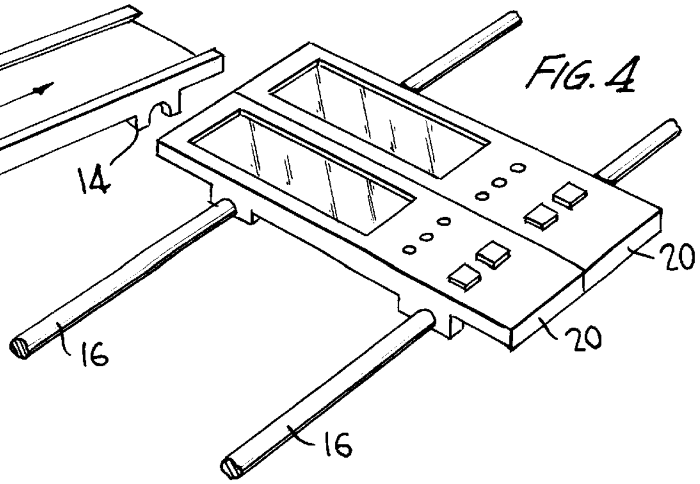
FIG. 4

ELECTRONIC FLIGHT DATA STRIPS AND METHOD FOR AIR TRAFFIC CONTROL

FIELD OF THE INVENTION

This invention relates to improved tools and methods for air traffic control. More specifically, this invention relates to improvements in flight data strips used world-wide by air traffic controllers to maintain information concerning individual flights, and to corresponding improvements in air traffic control.

BACKGROUND OF THE INVENTION

Under current practice, paper flight data strips are used by air traffic controllers as a convenient device for maintaining information concerning flights under their control. The pertinent information concerning an aircraft entering or about to enter an air traffic controller's sector of responsibility, typically flight identification, airspeed, altitude, heading, destination, and the like, is received electronically from a central site and supplied to a printer which formats the data and prints it on a paper strip. The paper strip is then manually inserted into a plastic holder designed for this purpose and physically handed to the responsible air traffic controller. FIG. 1 shows a perspective view of such a printed strip, bearing information concerning a particular flight, being inserted into such a strip holder.

Upon receiving a strip, indicating acknowledgment of responsibility for the flight, the air traffic controller inserts it into a rack or bay. Placement of the paper strip in a plastic strip holder facilitates the convenient and orderly addition of the strip to others in the possession of the individual controller.

The placement of the particular strips within the rack, and their movement as the flight progresses, is strictly governed by the personal preferences of each individual air traffic controller.

This freedom of placement to accommodate personal work habits is a desired characteristic of the paper-based flight data strip. The inability to provide the air traffic controllers with the freedom to organize information on the flights for which they have responsibility as they choose is one reason why computer-based data display systems for replacing the paper strips (see, for example, U.S. Pat. No. 5,659,475 to Brown) have been unsuccessful to date.

The information on the flight data strip (such as flight number, altitude, destination, etc.) is periodically consulted by the air traffic controller as the associated aircraft passes through the controlled airspace. Changes to any of the printed information on the flight data strip, e.g. changes in altitude ordered by the controller, are relayed to the pilot either verbally or digitally via radio and written by the controller on the strip using a suitable writing instrument. Transfer of responsibility for the flight from one controller to another is effected by physical transfer of the strip. When the flight leaves the controlled airspace, the strip is removed from the plastic holder and the holder reused.

In the past, numerous attempts have been made to automate the flight data strip function. Most proposals involve capturing the incoming data and displaying it on a computer terminal. The configuration of the data displayed on the screen varied from a simple tabular format to a one-for-one graphical representation of the paper strip itself. None of these solutions found acceptance within the controller community because of the added complexity involved in changing the data and/or physically re-locating strip information on the screen. Nonetheless, improvements in air traffic control continue to be sought; see generally *Aviation Week & Space Technology* of Feb. 2, 1998, at pp. 42–63, and mentioning flight data strips at p. 55, discussing various perceived problems with the air-traffic control system. In particular, it is desired to allow more data to be provided on flight data strips, and to provide better means for updating information carried thereon, and to provide means for communicating controller-ordered updates to a central control site without loss of the flexibility of use of the present strip system.

The desired characteristics of an automated flight data strip system include providing individual air traffic controllers the freedom to re-arrange strips in any desired configuration to suit either traffic conditions or personal preferences, and the ability to easily modify the contents of the information displayed thereon.

OBJECTS OF THE INVENTION

It is therefore an object of the present invention to retain all of the desirable mechanical aspects of the paper-based flight data strips, e.g., as now in use, while simultaneously expanding their data storage and display capabilities.

More specifically, it is an object of the invention to replace the cumbersome paper strips and holders now in use with integrated electronic flight data strips, wherein the data now printed on the paper strips is automatically displayed on a small screen, thus avoiding the steps of retrieving new strips from a printer and inserting the strips into holders, while it is also desired to preserve the flexibility of use of the present system.

It is accordingly an object of the present invention to provide a portable, self-contained, battery-operated, electronic flight data strip (EFDS) to replace the paper-based printed flight data strip in present use.

An object of the current invention is to provide an electronic flight data strip comprising a suitable communications interface to both receive and transmit data to an external terminal for the purpose of exchanging status, data changes, requests for data, time updates, and diagnostic memory "dumps." The communications interface can take the form of a wireless communication link, such as a short-range radio transmitter/receiver or a photo-optically coupled, infrared transmitter/receiver, or may be a temporary "hard-wired" connection, e.g., effected by plugging a cable from a computer device into a socket on the electronic flight data strip for a period sufficient to allow data transfer.

Another object of the current invention is to provide an electronic flight data strip comprising an internal microprocessor/controller capable of implementing stored data and display processing commands and responding to data inquiries from the individual air traffic controller as well as from related external data processing equipment. This function may be performed by a single electronic microprocessor/controller device or by several interconnected devices, each dedicated to performing a subset of the required display, data processing and communications functions.

Still another object of the present invention is to provide an electronic flight data strip comprising an internal data storage memory capable of interfacing with the internal microprocessor/controller(s) for the purpose of storing and retrieving data relating to air traffic control applications, operational status of the device, changes to air traffic control data, and similar archival information.

Yet another object of the current invention is to provide an electronic flight data strip comprising means for displaying stored alphanumeric and graphic and flight status information to the air traffic controller. This display capability may take the form of a liquid crystal display or light emitting diodes.

Another object of the current invention is to provide an electronic flight data strip incorporating means allowing the air traffic controller to initiate the execution of pre-programmed functions such as data display scrolling, status inquiry and display, clearing of alarm indications and similar control actions.

An ultimate object of the invention is to provide improved air traffic control procedures using the electronic flight data strips of the invention.

SUMMARY OF THE INVENTION

The electronic flight data strip of the present invention comprises a self-contained battery-powered device in a physical package compatible with present-day paper flight data strip holders, and providing a display including information at least equivalent to that provided by present-day paper flight data strips, so as to be functionally interchangeable therewith, avoiding any necessity of air traffic controller retraining or operator resistance. The electronic flight data strip of the present invention comprises a multi-line display screen for displaying the flight data needed by air traffic contollers, and is connected, for example, by wireless radio or infrared or temporary hard-wired connection to an external terminal device receiving data on incoming flights from a central control site. Information stored by the electronic flight data strip of the present invention can be updated by the controller by pressing a limited number of buttons provided on the device, or by re-establishing connection to an overall control system, and can then be communicated to a central air traffic control site.

As noted, the electronic flight data strip of the present invention incorporates a power source, such as a rechargeable battery, to supply the electrical power required to operate the internal electronic components, and allowing the device to be self-contained and employed without wire connection; this is important to allow use of the electronic flight data strip in the same manner as present-day paper flight data strips and associated holders. The rechargeable battery may be recharged after removal from the electronic flight data strip or while still located within the unit.

Other aspects and features of the electronic flight data strip of the invention will be apparent as the discussion below proceeds.

BRIEF DESCRIPTION OF THE DRAWINGS

The invention will be better understood if reference is made is to the accompanying drawings, in which:

FIG. 1 shows a perspective view of the prior art paper flight data strips, and the plastic holder employed to support such strips for convenient arrangement;

FIG. 2 shows a perspective view of the electronic flight data strip of the invention, and illustrates schematically two possible ways for it to be connected to an external terminal;

FIG. 3 shows a plan view of the electronic flight data strip of the invention;

FIG. 4 shows a perspective view of the manner in which the electronic flight data strip of the invention may be supported on a rack; and FIG. 5 shows a schematic block diagram of the principal circuit components of the electronic flight data strip of the invention.

DETAILED DESCRIPTION OF THE PREFERRED EMBODIMENTS

As mentioned above, FIG. 1 illustrates the prior art paper flight data strip 10, on which is printed data relevant to a given flight. More specifically, as a flight enters the controlled airspace, a printer connected to a central control site prints a strip including flight identification, altitude, bearing, airspeed, destination, and similar information. As they are printed, the strips are inserted into molded plastic holders 12, and handed to individual air traffic controllers, thus assigning responsiblity for the flight to the individual.

As shown, the holder 12 is generally rectangular, and comprises four pairs of spaced feet 14, shaped and spaced to fit over spaced parallel rods 16 (see FIG. 4); each air traffic controller is assigned a work space having one or more pairs of rods 16 mounted therein. The controllers can then place the individual strips in their holders on the rods, or elsewhere, as they prefer. As noted above, while it is an object of the invention to replace the cumbersome paper strips and holders with integrated electronic flight data strips, wherein the data printed on the paper strips is automatically displayed on a small screen, thus avoiding the steps of retreiving new strips from a printer and inserting the strips into holders, it is also desired to preserve the flexibility of use of the present system.

Referring now to FIGS. 2 and 3, the electronic flight data strip 20 according to the invention comprises a housing 22 of configuration generally similar to the holders 12 used in the prior art to hold paper flight data strips. Housing 22 comprises pairs of feet 14, shaped and spaced to fit over rods 16 (FIG. 4); again, it is desired to provide the air traffic controllers with the ability to use the electronic flight data strip 20 according to the invention in the same general manner as the prior art paper strips and holders.

The electronic flight data strip 20 according to the invention also includes an alphanumeric display screen 24, such as a liquidcrystal display, for displaying pertinent flight information, one or more switches 26 to allow the controllers to enter updated data, which may be push-button switches, membrane switches, or the equivalent, and one or more indicator lamps or LEDs 28 to provide status indications, alarm signals, and the like. It is to be understood that these Figures are not to scale and that the relative proportions, locations, shapes, or number of elements shown thereon is not in any way limiting on the scope of the present invention.

Also indicated generally in FIG. 2 are several options for communication between the electronic flight data strip 20 according to the invention and an external terminal 30; terminal 30 provides the communication interface between the individual electronic flight data strips 20 and a central control site 32. A first option, illustrated schematically at 34, consists of a paired optical source and detector operating in the infrared, the detector being comprised by the electronic flight data strip 20 and the source by the external terminal 30. Data concerning flights entering the controlled airspace is sent using existing links from the central site 32 to the external terminal 30, located, for example, in an airport control tower. Rather than print out paper strips, as in the prior art, the communication link 34 is employed to transmit the flight data directly to the electronic flight data strip 20; the flight data is then displayed on screen 24 for use by the controller.

According to an important preferred feature of the invention, bidirectional communication (indicated by heads on both ends of the arrows indicating the wireless communication link at 34) is provided between the electronic flight data strip 20 and the external terminal 30, and thence to the central site 32. Where implemented using infrared communication, both the strip and the terminal would comprise optical sources and detectors operating in the infrared. Bidirectional communication between the electronic flight data strip and the external terminal allows data stored in the memory of the strip to be downloaded from time to time, and the like; the data can then be transmitted to the central site by terminal 30, e.g., for archival purposes. The bidirectional communication facility also permits, for example, verification of status to be communicated from the strip to the terminal, allows data changes, and response to requests for data, time updates, and diagnostic memory "dumps". This facility allows, for example, a change in altitude of a given flight ordered by an air traffic controller by pressing the buttons 26 to be communicated automatically to the terminal device 30 and then to the central site 32, and forwarded to the pilot.

It is also within the scope of the invention to provide a temporary hard-wired connection between the electronic flight data strip 20 and the external communication device 30, as indicated at 36. The same bidirectional communication possibility is again within the scope of the invention. In general, the hard-wired connection will be less convenient but also less costly.

As shown in FIG. 4, and as mentioned above, the shape of the external housing 22 of the electronic flight data strip 20 according to the invention is similar to the shape of the current paper-based flight data strip holder, so as to be accommodated by the existing flight data strip holders and racks. Communication between the electronic flight control strips and the terminal may be provided while the strips are in the rack, e.g., to allow convenient communication of altered flight data, such as altitude changes, ordered by the controller; if this further feature of the invention is adopted, the racks will of course require modification accordingly.

In the preferred embodiment, the alphanumeric display 24 is capable of displaying numbers, letters and symbols in a selection of font styles and sizes. A cursor is used to highlight a character or group of characters. Individual characters or groups of characters are capable of being displayed in a normal mode (dark on light), in "reverse video" (light on dark), or to blink on and off at a predetermined rate per second. Two or more fields can also be displayed individually and sequentially within the same area of the display. The display is capable of being backlit. The light level of the light is capable of being adjusted to enhance readability in a darkened environment.

In the preferred embodiment the electronic flight data strip 20 according to the invention comprises one or more pushbutton switches 26 that can be used by the air traffic controller to initiate or terminate operations within the unit. The pushbuttons are not dedicated to performing a single function, but can be used for a wide variety of functions by movement of the cursor to desired points in appropriate menus appearing on screen 24, in accordance with generally understood principles of user interface design. An internal microprocessor/controller 40 (see discussion of FIG. 5 below) detects actuation of any of pushbuttons 24 and executes an operation which is a function of the current operational mode, that is, corresponding to a currently-displayed menu. For example, a pushbutton may be used to designate that the electronic flight data strip 20 is ready to be updated by an external source of data, or under different circumstances the same pushbutton may be used to acknowledge an alarm condition, thereby removing the alarm display. The pushbuttons may also be capable of containing separately addressable display indicators.

In the preferred embodiment, the electronic flight data strip 20 according to the invention also contains one or more display indicators 28, that is, small bulbs or LEDs, used to provide visual signals to the air traffic controller. Each is capable of notifying the air traffic controller of the existence, initiation, or completion of a specific operation. Indicators 28 of various colors are used to signal different events. Each indicator 28 is capable of being turned on and off independently and at a different rate. All indicators 28 are controlled by the internal microprocessor/controller and may represent a different condition as a function of the mode of the EFDS. For example, an indicator may light steadily to show that a data update message is being received, or may be placed into a flashing mode to gain the air traffic controller's attention in an emergency situation.

FIG. 5 shows a block diagram schematically illustrating the basic circuit components of the electronic flight data strip 20 according to the invention. In general, the circuitry of the EFDS is implemented using components and techniques common to products implemented using microprocessors, and is within the skill of the art. Thus, a central microprocessor/controller 40 performs control and data handling functions and is connected to further electronic components, including display 24, switches 26, indicators 28, a communications interface 50, and memory 52, by means of control, data and address buses 42, 46, and 48 respectively, as is common in the microprocessor art.

Incoming messages from external data sources are received via communications interface 50. As mentioned, external signals may be provided by a wireless connection, such as paired infrared photo-optic devices or a low-power radio frequency transmitter, or a temporary hard-wired connection may be provided for a brief time to enable, for example, uploading of flight data from an external terminal 30, or downloading of data stored in memory 52. As noted, these communications facilites are bidirectional to permit the electronic flight data strip 20 to receive and transmit messages as needed, for example, to be employed as a source of messages to be sent to a central site.

The microprocessor/controller 40 examines each incoming message. If desired, known methods for error detection and correction may be employed to allow the microprocessor/controller to determine the validity of incoming messages (i.e., ensure that they have been received error-free) before executing the message. Data messages for display to the operator are forwarded to the display screen 24 and are also stored in associated memory 52. Incoming messages containing requests for data or status result in the data being gathered and applied to the communications interface 50.

Direct inputs from the air traffic controller are received by the microprocessor/controller 40 via the push-button switches 26, forming an input portion of the user interface; the requested function is accordingly initiated or terminated, depending upon the current mode of operation.

The on/off status of each indicator 28 is determined by the microprocessor/controller 40 and is a function of the current mode of the operation. A lighted indicator may signal the need for action by the air traffic controller or the internal status of the electronic flight data strip 20.

As mentioned, it is highly desirable that the electronic flight data strip 20 of the invention be a self-contained, discrete unit, so that the air traffic controllers can use the electronic flight data strip 20 as they are accustomed to use the paper strips in their plastic holders. Accordingly, an internal battery 54 supplies operating power to all of the electronic components of the EFDS. Battery 54 may be rechargeable externally or "trickle charged" while located in the EFDS rack, or while hard-wired for data communication.

As mentioned above, numerous desired objects are achieved by the electronic flight data strip 20 of the invention. The invention provides an electronic flight data strip comprising a suitable communications interface to both receive and transmit data to an external terminal for the purpose of exchanging status, data changes, requests for data, time updates, and diagnostic memory "dumps." The electronic flight data strip supports an internal control function capable of implementing stored data and display processing commands and responding to data inquiries from the individual air traffic controller as well as from related external data processing equipment. An internal data storage memory is provided capable of interfacing with the internal microprocessor/controller for the purpose of storing and retrieving data relating to air traffic control applications, operational status of the device, changes to air traffic control data, and similar archival information. The air traffic controller may initiate the execution of pre-programmed functions such as data display scrolling, status inquiry and display, clearing of alarm indications and similar control actions. These and additional functions generally relating to the storage and communication of data and control actions between the user, the electronic flight data strip, the terminal, and the central site are within the scope of the invention. Implementation of these functions is considered to be within the skill of the art.

It will also be appreciated that the external terminal, while comparable in general functionality to terminals now provided for printing paper strips in response to signals from central sites, will require some modification to be enabled to communicate with the electronic flight data strips according to the invention. Such modifications are within the skill of the art, as is the further addition of bidirectional communication capability, as discussed above.

Air traffic control procedures are improved according to the invention in a number of ways. The essential steps in air traffic control according to the invention are simply establishment of communication between the terminal and the electronic flight control strips, copying received flight data from the terminal to the electronic flight control strips, and use thereof; further improvements provided according to the invention relate to provision of memory and bidirectional communication. Replacement of paper flight control strips with electronic flight control strips provides immediate improvements in efficiency, as several handling steps are eliminated. Storage of flight control data by the memory of the electronic flight control strips, and subsequent downloading or interrogation as desired, particularly including any updated instructions ordered using the bidirectional communication capability thereof, will allow better reconstruction of event histories as needed.

Therefore, while a preferred embodiment of the invention has been disclosed in detail, the invention is not to be limited thereby, but only by the following claims.

What is claimed is:

1. A method of communicating flight data pertaining to at most a single flight to an air traffic controller for flight control, comprising the steps of:

- providing a portable, self-contained electronic flight data strip, comprising:
  - a housing comprising means for physically mating with and being supported by existing mounting structure;
  - a display screen for display of flight data pertaining to at most a single flight;
  - a communications interface for receiving flight data pertaining to at most a single flight from an external terminal;
  - a microprocessor/controller connected to said communications interface for receiving said flight data pertaining to at most a single flight from said communications interface and to said display screen for displaying said data pertaining to at most a single flight on said display screen;
  - means connected to said microprocessor/controller for accepting control input from an operator; and
  - a battery for powering operation of said display screen, microprocessor/controller, and communications interface;
- providing an external terminal effectively connected to a central site, for receiving flight data pertaining to at most a single flight therefrom;
- establishing effective communication between said external terminal and said communications interface;
- communicating said flight data pertaining to at most a single flight to said electronic flight data strip by way of said communication interface; and
- displaying said flight data pertaining to at most a single flight on said display screen.

2. The method of claim 1, comprising the further step of establishing bidirectional communication between said electronic flight data strip and said terminal, whereby updated flight information pertaining to said at most a single flight can be communicated to said central site by way of said terminal.

3. The method of claim 1, wherein said communications interface comprises means for effecting a wireless connection to corresponding means comprised by an external terminal.

4. The method of claim 1, wherein said wireless connection is effected employing one or more pairs of optical sources and detectors operating in the infrared comprised by said terminal and said electronic flight data strip.

5. The method of claim 1, wherein said wireless connection is effected by radio-frequency transmitter and receiver means comprised by said terminal and said electronic flight data strip.

6. The method of claim 1, wherein said communications interface comprises means for effecting a temporary hard-wired connection between said electronic flight data strip and an external terminal.

7. The method of claim 1, comprising the further step of storing said flight data pertaining to said at most a single flight received by said electronic flight data strip in memory means comprised thereby.

8. A portable, self-contained electronic flight data strip for display of flight data pertaining to at most a single flight, comprising:

- a housing comprising means for physically mating with and being supported by existing mounting structure;
- a display screen for display of flight data pertaining to at most a single flight;
- a communications interface for receiving flight data pertaining to at most a single flight from an external terminal;
- a microprocessor/controller connected to said communications interface for receiving said flight data pertaining to at most a single flight from said communications interface and to said display screen for displaying said data pertaining to at most a single flight on said display screen;

means connected to said microprocessor/controller for accepting control input from an operator; and a battery for powering operation of said display screen, microprocessor/controller, and communications interface.

9. The electronic flight data strip of claim 8, wherein said communications interface comprises means for effecting a temporary hard-wired connection between said electronic flight data strip and an external terminal.

10. The electronic flight data strip of claim 8, wherein said communications interface permite bidirectional communication between said electronic flight data strip and said terminal, whereby updated flight information can be communicated to a central site by way of said terminal.

11. The electronic flight data strip of claim 8, further comprising memory means for storing said flight data pertaining to at most a single flight received by said electronic flight data strip.

12. The electronic flight data strip of claim 8, wherein said means connected to said microprocessor/controller for accepting control input from an operator comprises one or more pushbuttons.

13. The electronic flight data strip of claim 8, wherein said communications interface comprises means for effecting a wireless connection to corresponding means comprised by an external terminal.

14. The electronic flight data strip of claim 13, wherein said wireless connection comprises one or more pairs of optical sources and detectors operating in the infrared comprised by said terminal and said electronic flight data strip.

15. The electronic flight data strip of claim 13, wherein said wireless connection comprises radio-frequency transmitter and receiver means comprised by said terminal and said electronic flight data strip.

* * * * *